(12) United States Patent
Kim et al.

(10) Patent No.: US 8,730,893 B2
(45) Date of Patent: May 20, 2014

(54) GROUP RESOURCE ALLOCATION METHOD IN BROADBAND WIRELESS ACCESS SYSTEM AND APPARATUS THEREFOR

(75) Inventors: Jeong Ki Kim, Anyang-si (KR); Young Soo Yuk, Anyang-si (KR); Yong Ho Kim, Anyang-si (KR); Ki Seon Ryu, Anyang-si (KR)

(73) Assignee: LG Electronics Inc., Seoul (KR)

( * ) Notice: Subject to any disclaimer, the term of this patent is extended or adjusted under 35 U.S.C. 154(b) by 395 days.

(21) Appl. No.: 13/264,623

(22) PCT Filed: Apr. 15, 2010

(86) PCT No.: PCT/KR2010/002357
§ 371 (c)(1),
(2), (4) Date: Oct. 14, 2011

(87) PCT Pub. No.: WO2010/120136
PCT Pub. Date: Oct. 21, 2010

(65) Prior Publication Data
US 2012/0039289 A1 Feb. 16, 2012

Related U.S. Application Data

(60) Provisional application No. 61/169,323, filed on Apr. 15, 2009, provisional application No. 61/173,966, filed on Apr. 29, 2009.

(51) Int. Cl.
H04W 4/00 (2009.01)
H04L 12/28 (2006.01)
H04W 28/04 (2009.01)
H04W 28/02 (2009.01)
H04W 72/04 (2009.01)

(52) U.S. Cl.
CPC ............. *H04W 28/04* (2013.01); *H04W 28/02* (2013.01); *H04W 72/04* (2013.01)

USPC ............................ 370/329; 370/338; 370/431

(58) Field of Classification Search
None
See application file for complete search history.

(56) References Cited

U.S. PATENT DOCUMENTS

2007/0206561 A1    9/2007  Son et al.
2008/0025337 A1    1/2008  Smith et al.
(Continued)

FOREIGN PATENT DOCUMENTS

KR    10-2007-0080735 A    8/2007
KR    10-2008-0039616 A    5/2008

*Primary Examiner* — Kevin C Harper
*Assistant Examiner* — Peter Chen
(74) *Attorney, Agent, or Firm* — Birch, Stewart, Kolasch & Birch, LLP

(57) ABSTRACT

The present invention relates to a broadband wireless access system, and more specifically, to a reliable group resource allocation method and an apparatus therefor. A group resource allocation operating method of a terminal in a broadband wireless access system according to one aspect of the present invention comprises the steps of: receiving a message which includes group setup information from a base station; determining a channel identifier of a $1^{st}$ map for group resource allocation received from the base station by using the group setup information; receiving a $2^{nd}$ map from the base station which includes the channel identifier determined by the base station; comparing the channel identifier determined by the terminal with a channel identifier value included in the $2^{nd}$ map; and transmitting an extended header which includes inconsistency information to the base station if the channel identifier of the $1^{st}$ map determined by the terminal is inconsistent with the channel identifier value included in the $2^{nd}$ map according to a comparison of the results.

17 Claims, 10 Drawing Sheets

(56) References Cited

U.S. PATENT DOCUMENTS

| | | |
|---|---|---|
| 2008/0065944 A1* | 3/2008 | Seol et al. ............... 714/748 |
| 2008/0101269 A1 | 5/2008 | Jung et al. |
| 2008/0165670 A1* | 7/2008 | Tao et al. ............... 370/203 |
| 2008/0209301 A1* | 8/2008 | Chang et al. ............ 714/749 |
| 2009/0067364 A1* | 3/2009 | Chang et al. ............ 370/315 |
| 2009/0097426 A1* | 4/2009 | Yin ........................ 370/329 |
| 2009/0219878 A1* | 9/2009 | Oh et al. ................. 370/329 |

\* cited by examiner

Fig. 4

| LAST(1) | TYPE=GRA ERROR EVENT REPORT |
|---|---|
| | GROUP ID |

Fig. 7

| LAST(1) | TYPE=[GRA ACID] | | | |
|---|---|---|---|---|
| | ACID | | | |

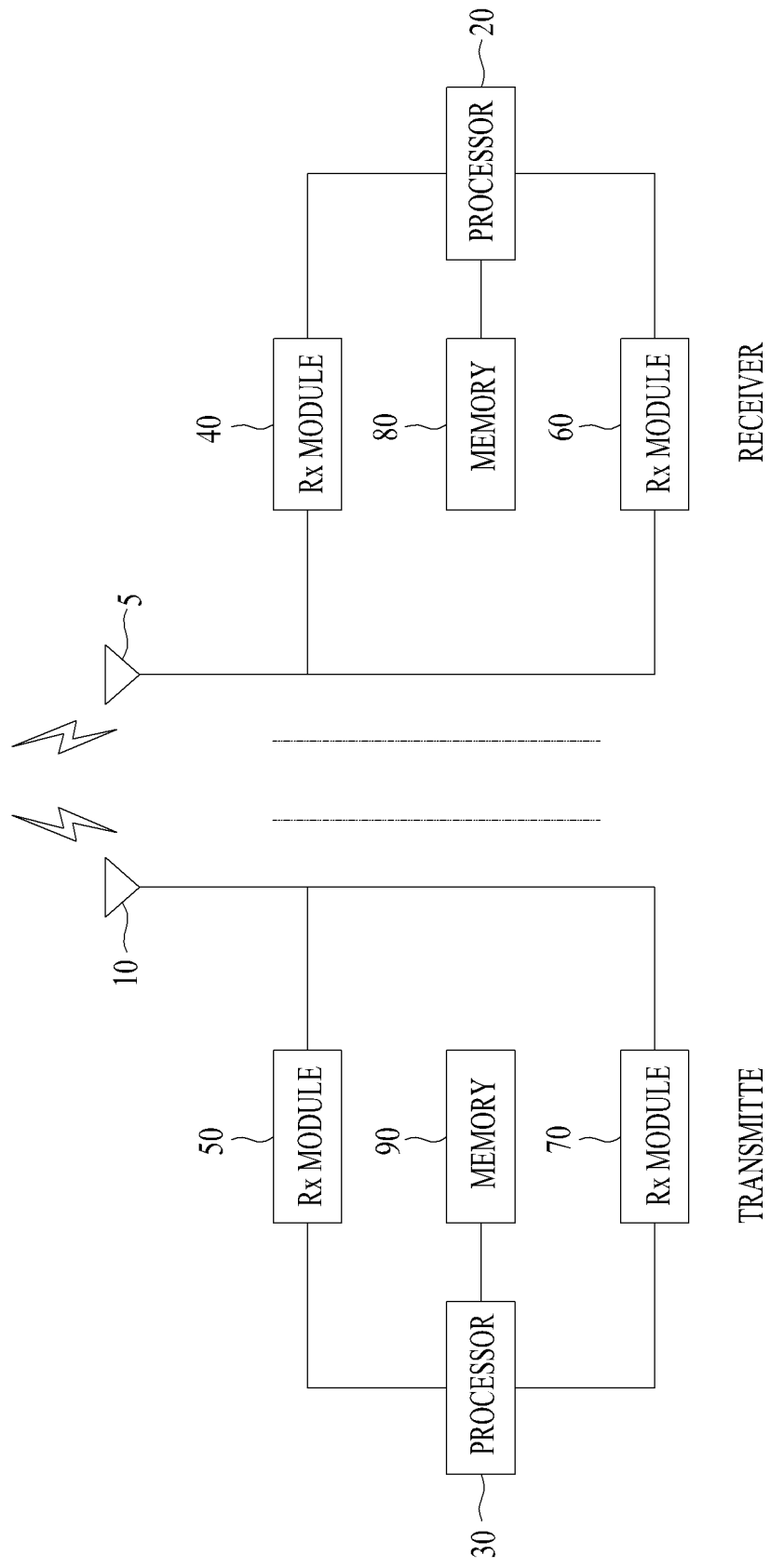

GROUP RESOURCE ALLOCATION METHOD IN BROADBAND WIRELESS ACCESS SYSTEM AND APPARATUS THEREFOR

CROSS REFERENCE TO RELATED APPLICATIONS

This application is the National Phase of PCT/KR2010/002357 filed on Apr. 15, 2010, which claims priority under 35 U.S.C. 119(e) to U.S. Provisional Application Nos. 61/169,323 filed on Apr. 15, 2009 and 61/173,966 filed on Apr. 29, 2009, all of which are hereby expressly incorporated by reference into the present application.

TECHNICAL FIELD

The present invention relates to a broadband wireless access system, and more particularly, to a method for reliably allocating group resources and an apparatus for performing the same.

BACKGROUND ART

In a mobile communication system, a Base Station (BS) transmits and receives data to and from a number of User Equipments (UEs) within a cell/sector in a radio channel environment. In a multi-carrier or alike system, a BS receives packet traffic from a wired Internet and transmits the received packet traffic to each UE in a predetermined communication scheme. The process of determining a UE to transmit data to and a timing and frequency area in which to transmit the data to the UE by the BS is called downlink scheduling. In addition, the BS receives data from a UE in a predetermined communication scheme, demodulates the received data, and transmits the packet traffic over the wired Internet. The process of determining a UE to transmit uplink data and a timing and frequency band in which the UE is supposed to transmit the data by the BS is called uplink scheduling. In general, a UE in good channel state is scheduled to transmit and receive data for a longer time in more frequency resources.

FIG. 1 is a view referred to for describing time-frequency resource blocks. In the multi-carrier or alike system, communication resources may be divided largely into a time area and a frequency area. The resources may be defined as resource blocks, each resource block including N subcarriers by M subframes or N predetermined time units. N and M may be 1. In FIG. 1, one square represents one resource block and a resource block is defined as a plurality of subcarriers along an axis by a predetermined time unit along another axis. On a downlink, a BS selects a UE according to a predetermined scheduling rule, allocates one or more resource blocks to the selected UE, and transmits data to the UE in the allocated resource blocks. On an uplink, the BS selects a UE according to a predetermined scheduling rule and allocates one or more resource blocks to the selected UE. The UE receives scheduling information indicating that the BS has allocated certain resource blocks to the UE and transmits uplink data in the allocated resources.

In the downlink scheduling scheme, the BS selects time-frequency resource blocks in good channel state based on a Channel Quality Indicator (CQI) representing a downlink channel state, reported from a UE and transmits data using the selected time-frequency resource blocks. Owing to the time-frequency resource blocks in the good channel state, more data can be transmitted in the limited resource blocks, thereby increasing the overall data throughput of the system. Likewise in the uplink scheduling scheme, a BS scheduler measures the reception state of a pilot signal (or a reference signal) transmitted by a UE, selects time-frequency resource blocks in good uplink channel state, allocates the selected resource blocks to the UE so that the UE transmits uplink data in the allocated resources.

The above-described scheduling may be performed on a group basis.

Group Resource Allocation (GRA) is a scheme of allocating resources to a plurality of users within a group in order to reduce the overhead of control messages that a BS transmits to UEs. Since information about resource allocation positions (i.e. resource start offsets and resources sizes), the MCS levels of bursts, etc. that are indicated to UEs in case of resource allocation to individual UEs are compressed and then transmitted to the UEs, control information overhead can be reduced.

FIG. 2 illustrates an exemplary method for allocating group resources using bitmaps.

Referring to FIG. 2, bitmaps may be used to transmit resource allocation information to UEs within a predetermined group. A user bitmap, a first bitmap indicates UEs scheduled at a corresponding time instant in a corresponding group. The respective bits of the user bitmap are mapped to the UEs of the group in a one-to-one correspondence. In FIG. 2, one group may include up to 6 users and if a bit of the user bitmap is set to '1', this implies that a user mapped to the bit is a scheduled user (i.e. a user to which resources have been allocated) for a current frame.

$1^{st}$, $2^{nd}$, $4^{th}$ and $6^{th}$ users are scheduled for frame n. When a UE is added to the group, the UE may receive position information indicating its position in the user bitmap from the BS. A resource allocation bitmap represents resource allocation information for the scheduled users. The resource allocation information may contain information about Modulation and Coding Scheme (MCS) levels and allocated resource sizes. In the illustrated case of FIG. 2, resource allocation information for each UE may be represented in 3 bits. Because a total of 4 UEs are scheduled in frame n, the resource allocation bitmap is 12(=3×4) bits long. For frame n+p, 5 UEs are scheduled and thus a 15-bit resource allocation bitmap is formed.

GRA is typically adopted for real-time traffic. When a new packet is generated in an area allocated by GRA, the new packet should be transmitted irrespective of retransmission of a previous packet in order to minimize the delay of the new packet. Therefore, in the case of GRA, multiple Hybrid Automatic Repeat reQuest (HARQ) channels should be used for one connection.

For this purpose, two or more hArq Channel Identifiers (ACIDs) may be used for a connection using GRA. An ACID is an identifier that identifies an HARQ channel and an HARQ channel may mean an HARQ process. ACID information for a multiple-HARQ operation should be shared between a BS and a UE. The simplest way is to include ACID information for each individual UE in scheduling information for GRA, that is, a GRA A-MAP Information Element (IE) as done in a general multiple-HARQ operation. Since the GRA A-MAP IE is transmitted each time group resources are allocated, the inclusion of ACIDs in the GRA A-MAP IE may cause MAP overhead, high MAP overhead especially when more UEs of a group are scheduled through the GRA A-MAP IE.

To avert this problem, when a BS allocates a specific group to a UE, the BS may notify the UE of ACID information by including an initial ACID value and the number of HARQ channels, N_ACID used between the BS and the UE for corresponding GRA in a group allocation message (e.g. a group configuration message or a group configuration A-MAP IE). Each time the UE receives a GRA A-MAP IE, the UE increases the initial ACID value using the received ACID information. If the ACID has been changed N_ACID times, the UE returns to the initial ACID. Thus, the UE can implicitly determine an ACID even though the ACID is not included in the GRA A-MAP IE. In this manner, the overhead of the GRA A-MAP IE can be reduced.

However, in case where the GRA A-MAP IE is lost, there exists a need for defining a method for efficiently recovering a GRA procedure.

DISCLOSURE

Technical Problem

An object of the present invention devised to solve the conventional problem is to provide a method and apparatus for efficiently allocating group resources.

Another object of the present invention is to provide a method and apparatus for efficiently correcting an error caused by a mismatch between hArq Channel Identifiers (ACIDs) in Group Resource Allocation (GRA).

It will be appreciated by persons skilled in the art that the objects that could be achieved with the present invention are not limited to what has been particularly described hereinabove and the above and other objects that the present invention could achieve will be more clearly understood from the following detailed description.

Technical Solution

In an aspect of the present invention, a method for performing a group resource allocation operation at a user equipment in a broadband wireless access system includes receiving a message including group configuration information from a base station, determining a channel Identifier (ID) of a first MAP for group resource allocation, received from the base station, using the group configuration information, receiving a second MAP including a base station-determined channel ID from the base station, comparing a user equipment-determined channel ID with the channel ID included in the second MAP, and transmitting an extended header including mismatch information to the base station, if the channel ID of the first MAP determined by the user equipment is different from the channel ID included in the second MAP as a result of the comparison.

The method may further include decoding a data burst received in a resource area indicated by the first MAP, and transmitting feedback information indicating a result of the decoding to the base station. The second MAP reception may be performed when the decoding is failed and the feedback information is a NACK.

The mismatch information may include a type field set to a value indicating a mismatch error and an ID of a group to which the user equipment belongs, or a type field set to a value indicating inclusion of a channel ID determined by the user equipment and the channel ID determined by the user equipment.

In another aspect of the present invention, a method for performing a group resource allocation operation at a base station in a broadband wireless access system includes transmitting a message including group configuration information to a user equipment, transmitting to the user equipment a first MAP for group resource allocation corresponding to a channel ID determined according to the group configuration information, transmitting to the user equipment a data burst in a resource area indicated by the first MAP, transmitting to the user equipment a second MAP indicating an area in which the data burst is to be retransmitted and including the channel ID, upon receipt of a NACK for the data burst from the user equipment, and receiving an extended header from the user equipment according to whether a user equipment-determined channel ID is identical to the channel ID included in the second MAP.

If the user equipment-determined channel ID is different from the channel ID included in the second MAP, the extended header may include a type field set to a value indicating a mismatch error and an ID of a group to which the user equipment belongs. In this case, the method may further include transmitting to the user equipment a third MAP including group deallocation information to delete the user equipment from the group.

If the user equipment-determined channel ID is different from the channel ID included in the second MAP, the extended header may include a type field set to a value indicating inclusion of a channel ID determined by the user equipment and the channel ID determined by the user equipment; In this case, the method may further include updating the channel ID determined by the base station to the channel ID determined by the user equipment.

In another aspect of the present invention, a user equipment includes a processor and a Radio Frequency (RF) module for externally transmitting and receiving radio signals. The processor acquires group configuration information from a message for group configuration received from a base station, determining a channel ID of a first MAP for group resource allocation, received from the base station, using the group configuration information, and controls transmission of an extended header including mismatch information to the base station, if the channel ID of the first MAP determined by the user equipment is different from a channel ID included in a second MAP received from the base station.

The processor may control decoding of a data burst received in a resource area indicated by the first MAP and control transmission of feedback information indicating a result of the decoding to the base station, and the second MAP may be received when the decoding is failed and the feedback information is a NACK.

In the above aspects of the present invention, the message may be a group configuration message and the group configuration information may include information about an ID of a group to which the user equipment belongs, an initial channel ID, and the number of channel IDs.

In the above aspects of the present invention, the first MAP may be a Group Resource Allocation Advanced-MAP Information Element (GRA A-MAP IE), the second MAP may be a basic assignment A-MAP IE, and the channel ID may be a hybrid Automatic repeat request Channel ID (ACID).

Advantageous Effects

According to the embodiments of the present invention, the following effects are achieved.

A UE and a BS can perform a group resource allocation procedure more efficiently in the embodiments of the present invention.

In addition, if the UE determines that its ACID is different from an ACID received from the BS, it reports an error to the BS. Therefore, the group resource allocation procedure can be recovered.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF THE DRAWINGS

FIG. 4 illustrates an exemplary structure of an extended header that a User Equipment (UE) can transmit to report an ACID mismatch to a Base Station (BS) in a GRA procedure according to an embodiment of the present invention.

FIG. 7 illustrates an exemplary structure of an extended header that the UE can transmit to report its ACID to the BS in the GRA procedure according to the embodiment of the present invention.

FIG. 10 is a block diagram of an exemplary transmitter and receiver according to another embodiment of the present invention.

BEST MODE FOR CARRYING OUT THE INVENTION

Figure 1:
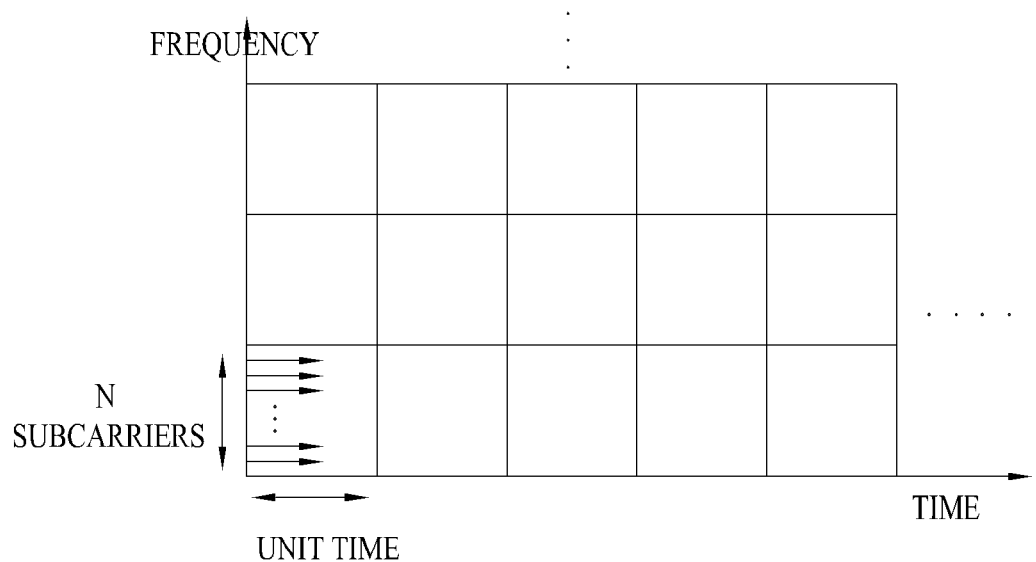
FIG. 1 is a view referred to for describing time-frequency resource blocks.
Figure 2:
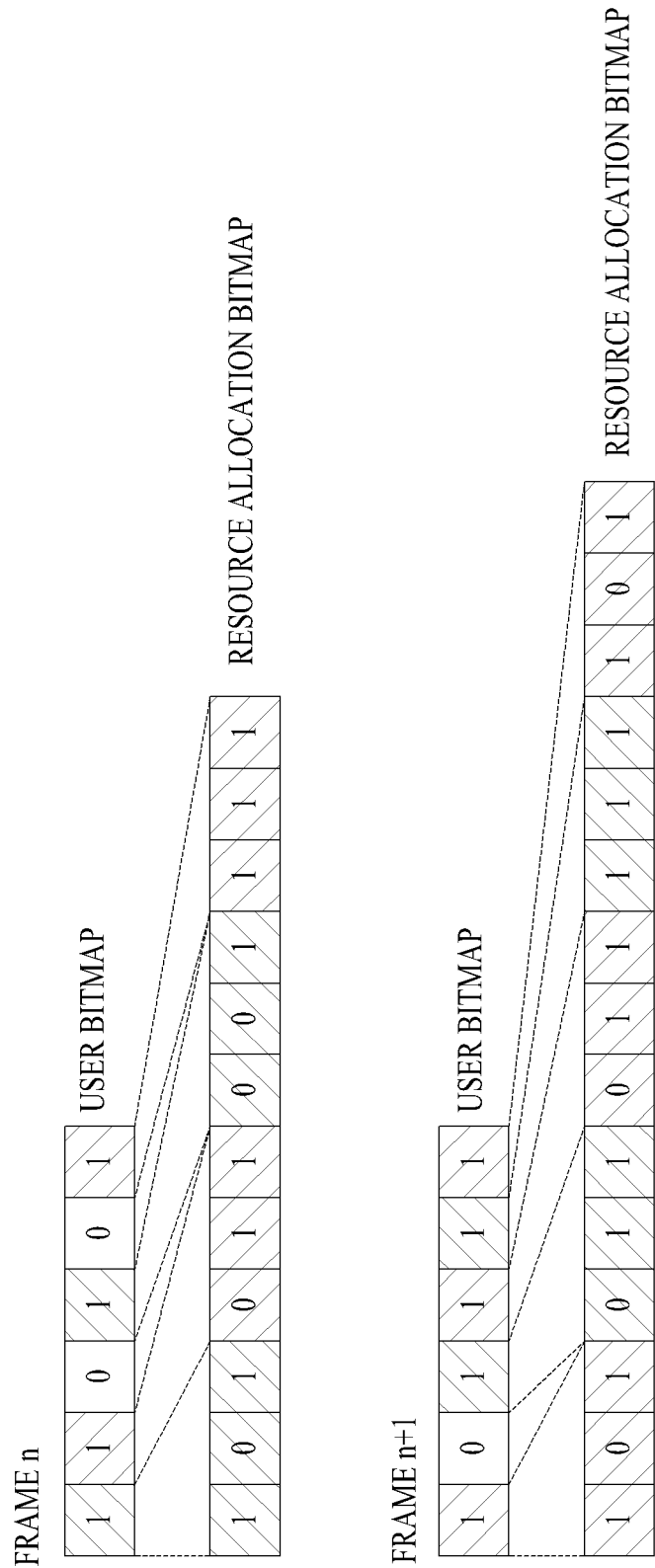
FIG. 2 illustrates an exemplary method for allocating group resources using bitmaps.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made, centering on a data transmission and reception relationship among a Base Station (BS) and a User Equipment (UE). A BS refers to a terminal node of a network, which communicates directly with a UE. In some cases, a specific operation described as performed by the BS may be performed by an upper node of the BS.

Namely, it is apparent that, in a network comprised of a plurality of network nodes including a BS, various operations performed for communication with a UE may be performed by the BS or network nodes other than the BS. The term 'BS' may be replaced with the term, fixed station, Node B, eNode B (eNB), Access Point (AP), etc. The term 'terminal' may be replaced with the term, UE, Mobile Station (MS), Mobile Subscriber Station (MSs), Advanced MS (AMS), or Subscriber Station (SS), etc.

The embodiments of the present invention may be achieved by various means, for example, hardware, firmware, software, or a combination thereof.

In a hardware configuration, the methods according to embodiments of the present invention may be achieved by one or more Application Specific Integrated Circuits (ASICs), Digital Signal Processors (DSPs), Digital Signal Processing Devices (DSDPs), Programmable Logic Devices (PLDs), Field Programmable Gate Arrays (FPGAs), processors, controllers, microcontrollers, microprocessors, etc.

In a firmware or software configuration, the methods according to embodiments of the present invention may be implemented in the form of a module, a procedure, a function, etc. that perform the above-described functions or operations. Software code may be stored in a memory unit and executed by a processor. The memory unit is located at the interior or exterior of the processor and may transmit and receive, data to and from the processor via various known means.

The embodiments of the present invention can be supported by standard documents disclosed for at least one of the wireless access systems of Institute of Electrical and Electronics Engineers (IEEE). 802; $3^{rd}$ Generation Partnership. Project (3GPP), 3GPP Long Term Evolution (3GPP LTE), and 3GPP2. That is, steps or parts that are not described to make the technical spirit of the present invention apparent in the embodiments of the present invention can be supported by the documents. In addition, all terms set forth in the specification can be explained by the standard documents. Especially, the embodiments of the present invention can be supported by one or more of the standard documents of IEEE 802.16 systems, P802.16-2004, P802.16e-2005, P802.16Rev2, and IEEE P802.16m.

Specific terms used herein are provided to help the understanding of the present invention and it is to be clearly understood that these terms may be replaced with other terms within the scope and spirit of the present invention.

A problem encountered with implicit sharing of ACIDs between a UE and a BS during GRA will be described below in detail.

If GRA is dynamically performed without periodicity, the UE is not aware of a time when a GRA A-MAP IE directed to the UE is supposed to be transmitted from the BS. Thus, the UE to which resources are allocated by GRA should search for a GRA A-MAP IE in every Transmission Time interval (TTI). In this situation, if ACID information for GRA is indicated to the UE during an initial group configuration (that is, an ACID is included in a group configuration message or a group configuration A-MAP IE), not by a GRA A-MAP IE, problems may occur.

For example, if the UE fails to receive a GRA A-MAP IE but the BS determines that the GRA A-MAP IE has been received successfully at the UE, ACID information shared between the BS and the UE may be erroneous. When a retransmission occurs despite the ACID error, the UE may delete the retransmission packet, determining that ACID information included in a retransmission A-MAP (i.e. a basic assignment A-MAP IE) has an error. This problem may last in retransmissions of all subsequent packets, which will be detailed with reference to FIG. 3.

Figure 3:
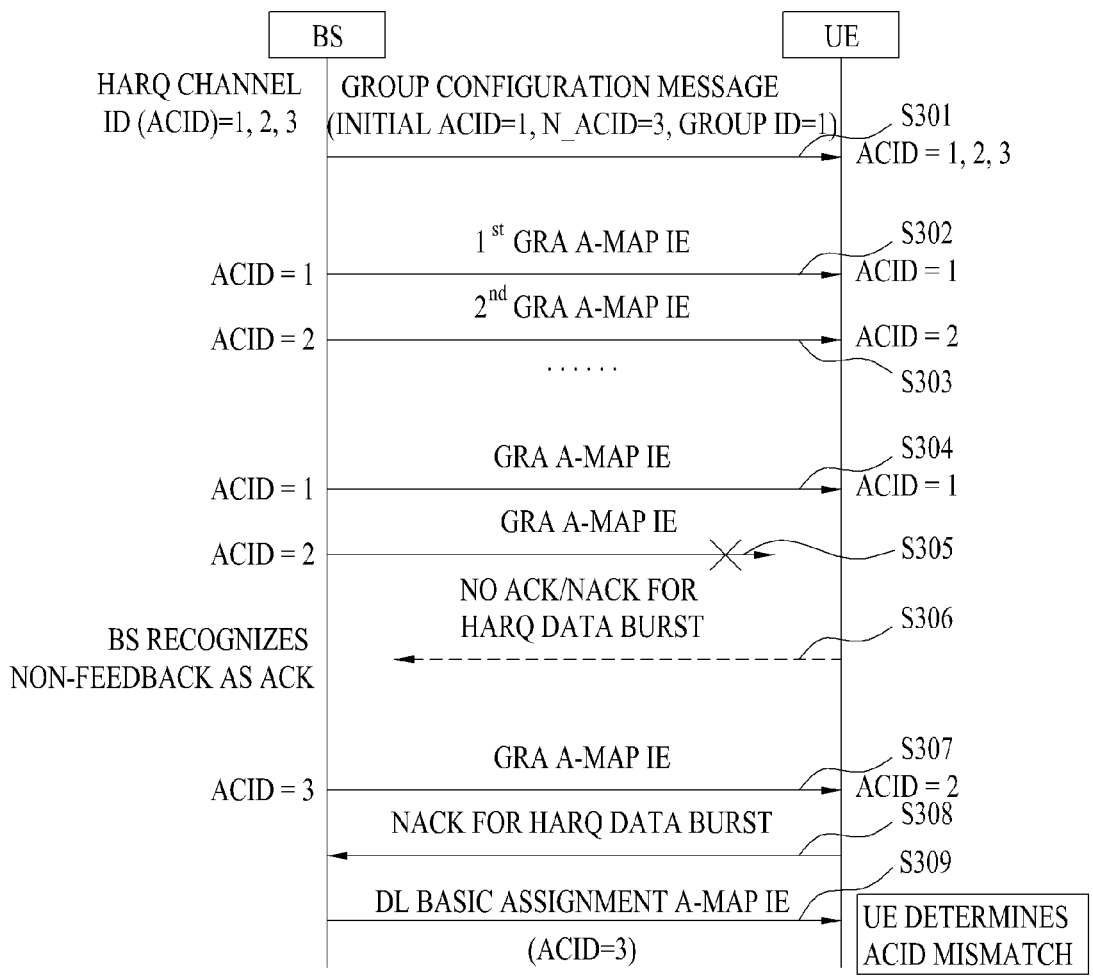
FIG. 3 illustrates a problem that may be encountered due to a mismatch between hArq Channel Identifiers (ACIDs) in Group Resource Allocation (GRA) to which HARQ is applied.

FIG. 3 illustrates a problem that may be generated due to a mismatch between ACIDs during GRA to which HARQ is applied.

Referring to FIG. 3, a BS may transmit a group configuration message to a UE, for GRA (S301).

The group configuration message includes an initial ACID, the number of ACIDs, and a group ID. Herein, it is assumed that the initial ACID is 1, three ACIDs (i.e. 1, 2 and 3) are used for a corresponding connection, and the group ID is 1. Therefore, each time a GRA A-MAP IE is transmitted, the UE may implicitly determine an ACID to be one of 1, 2 and 3 in the order of 1→2→3→1→2 . . . (i.e. (previous ACID+1)% N_ACID). In addition, it is assumed that the BS indicates resources carrying a downlink data burst to a UE corresponding to group ID 1 by a GRA A-MAP IE and the GRA A-MAP IE does not include an ACID in FIG. 3.

After transmitting the group configuration message, the BS transmits a $1^{st}$ GRA A-MAP IE to the UE in order to perform a GRA procedure with the UE (S302).

Because the initial ACID is 1, the UE may determine that the ACID of the $1^{st}$ GRA A-MAP IE is 1. The UE may receive the $1^{st}$ GRA A-MAP IE and then receive a downlink data burst in resources indicated by the GRA A-MAP IE. HARQ is also applied to the downlink data burst and the UE may transmit a feedback (i.e. an ACK/NACK) to the BS according to whether the UE has successfully received the data burst (hereinafter, referred to as "HARQ data burst"). Unless otherwise mentioned, it is assumed that the UE receives an HARQ burst successfully in resources indicated by a GRA A-MAP IE and transmits an ACK to the BS.

Then, the BS transmits a $2^{nd}$ GRA A-MAP IE to the UE and the UE may be aware that the GRA A-MAP IE corresponds to ACID 2 (S303).

The UE may receive the $2^{nd}$ GRA A-MAP IE and receive a downlink data burst in resources indicated by the $2^{nd}$ GRA A-MAP IE (not shown).

Because the number of ACIDs is 3, after a $3^{rd}$ GRA A-MAP IE (i.e. ACID=3) is transmitted, the ACID of the following GRA A-MAP IE becomes 1 again (S304).

However, the UE may fail to receive the GRA A-MAP IE corresponding to ACID 2 for a reason such as poor channel state (S305).

As a result, the UE may not transmit an ACK or NACK for the downlink HARQ data burst (S306).

Upon receipt of no signal from the UE, the BS generally determines the non-reception as a NACK. However, if the BS mistakes the non-reception for an ACK due to a channel error, the BS does not retransmit a corresponding packet.

The BS will transmit a GRA A-MAP IE for the next packet transmission. Determining that an HARQ data burst allocated by the GRA A-MAP IE corresponding to ACID 2 has been successfully received at the UE, the BS determines that ACID 3 corresponds to a currently transmitted GRA A-MAP IE (S307).

However, upon receipt of the GRA A-MAP IE, the UE determines that the ACID of the GRA A-MAP IE is 2, because it has failed to receive the GRA A-MAP IE corresponding to ACID 2.

If an HARQ data burst transmitted based on the GRA A-MAP IE has an error, the UE transmits a NACK for the HARQ data burst to the BS (S308).

Upon receipt of the NACK from the UE, the BS may use an A-MAP for retransmitting the corresponding packet (although a GRA A-MAP IE may be used for retransmission, a DL basic assignment A-MAP IE is used herein) (S309).

The DL basic assignment A-MAP IE for retransmission contains an ACID set to 3. Thus, the UE is aware that its ACID (=2) is different from the ACID (=3) indicated by the retransmission MAP and determines that the ACIDs are not synchronous. Then, the UE will delete an HARQ data burst received in resources indicated by the retransmission MAP and transmit a NACK to the BS on a corresponding HARQ ACK/NACK channel. If the BS receives the NACK, the BS will continue to retransmit the corresponding packet using the same ACID, thereby causing unnecessary resource consumption. If a subsequently transmitted packet needs retransmission, the above operation will be repeated.

First Embodiment

To solve the above problem encountered with the GRA procedure, an embodiment of the present invention provides a method for notifying a BS of an ACID information mismatch by a UE when the UE receives a retransmission A-MAP IE including a wrong ACID, so that the BS can correct the ACID.

Figure 4:
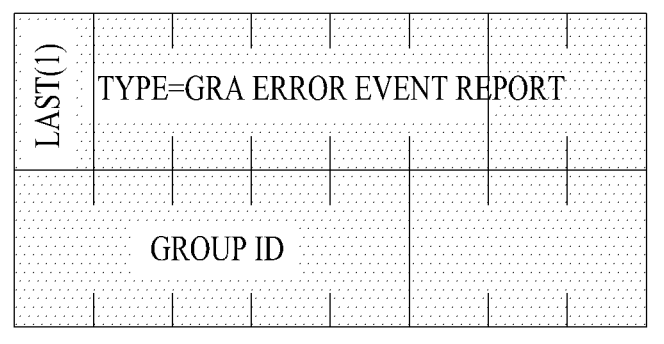

As a mechanism for notifying a BS of an ACID information mismatch, an extended header structure illustrated in FIG. 4 is proposed.

FIG. 4 illustrates an exemplary extended header structure that a UE can transmit to report an ACID mismatch to a BS in a group resource allocation procedure according to an embodiment of the present invention.

Referring to FIG. 4, an extended header by which a UE notifies a BS of wrong ACID information may include a Last field indicating whether the extended header is followed by another extended header, a Type field set to a value indicating that this extended header is for reporting a GRA error, and a Group ID field indicating the ID of a group to which the UE belongs. Hereinbelow, this header will be referred to as a "GRA Error Event Report Extended Header (GEER EH)".

Figure 5:
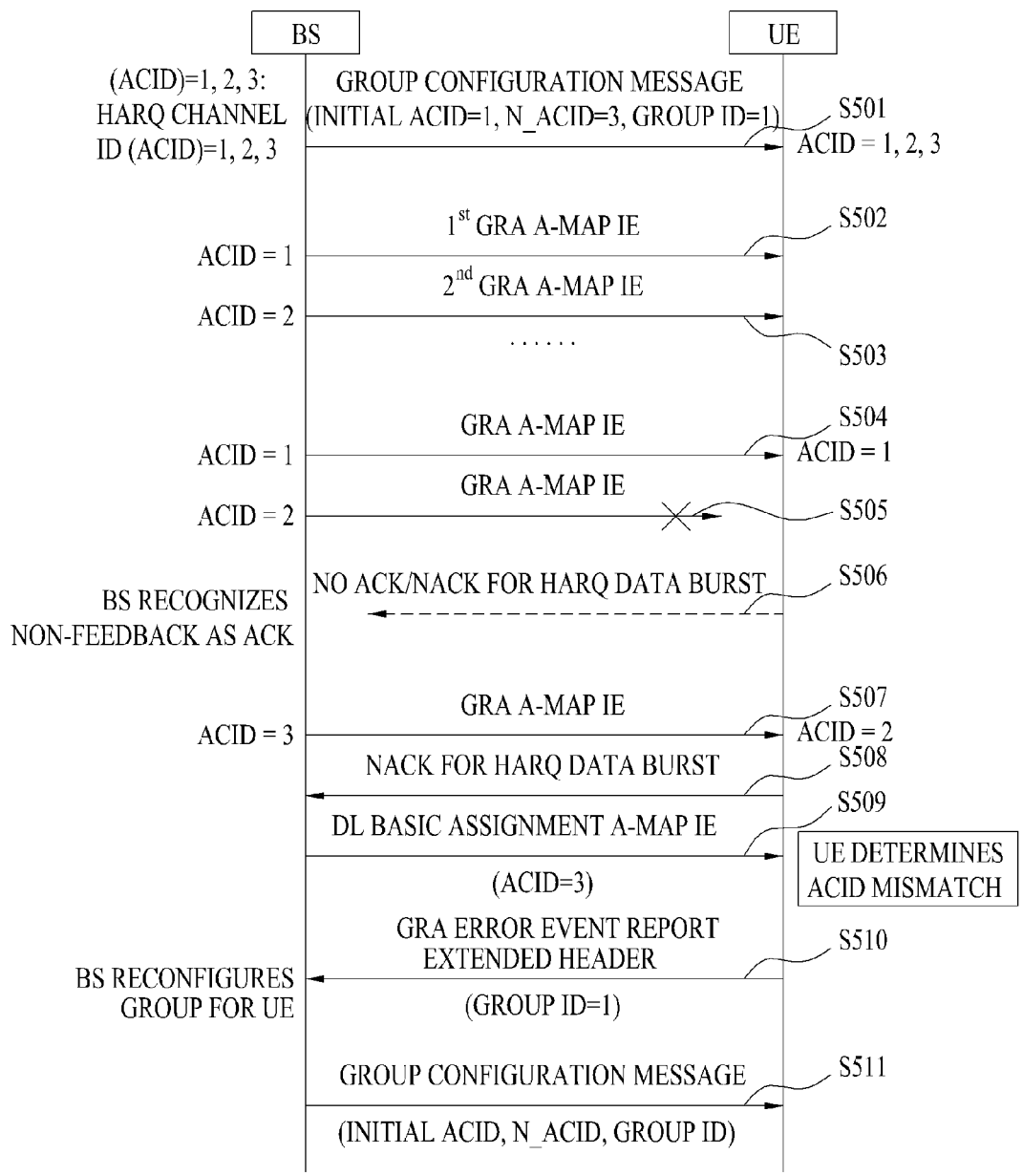
FIG. 5 illustrates an exemplary procedure for reporting an ACID error in an extended header to the BS by the UE in the GRA procedure according to the embodiment of the present invention.

With reference to FIG. 5, a detailed description will be given of a procedure for reporting an error in ACID information by an extended header described with reference to FIG. 4, when a UE determines that the ACID information has an error.

FIG. 5 illustrates an exemplary procedure for reporting an ACID error to a BS by an extended header in the group resource allocation procedure according to the embodiment of the present invention.

The procedure of FIG. 5 is based on the same assumption as that of FIG. 3 and thus steps S501 to S509 are similar to steps S301 to S309 of FIG. 3. Therefore, a redundant description of steps S501 to S509 will not be provided, for simplicity.

In step S509, since the UE preserves ACID 2 but a retransmission A-MAP (i.e. a DL basic assignment A-MAP IE) indicates ACID 3, the UE may determine that the ACID information mismatches.

Therefore, the UE deallocates GRA information configured for it, determining that GRA for the UE has an error. That is, the UE deallocates a resource allocation associated with GRA, including data allocation, a feedback channel (an ACK or NACK channel), etc. and discontinues a related operation.

The UE may notify the BS of occurrence of the GRA error by transmitting a GEER EH including a group ID (herein, 1) (S510).

Upon receipt of the GEER EH from the UE, the BS may delete information about the UE from the group, determining from the group ID included in the GEER EH that an error (i.e. an ACID information mismatch) has generated to the group.

Then, the BS transmits to the UE a group configuration message or a group configuration A-MAP IE to reconfigure a group for GRA (S511).

An initial ACID, the number of ACIDs, a group ID, etc. for the reconfigured group may be included in the group configuration message.

Upon receipt of the group configuration message, the UE may perform a GRA operation based on the information included in the group configuration message.

According to another aspect of the embodiment of the present invention, upon generation of a GRA error such as an ACID information mismatch, the UE may notify the BS of the GRA error by a Channel Quality Indicator CHannel (CQICH) codeword. That is, if a fast feedback channel has been allocated to the UE, for CQICH codeword transmission, the UE may notify the BS of the ACID mismatch or the GRA error by transmitting a predetermined CQICH codeword on the allocated channel. For this purpose, the BS may predefine the specific CQICH codeword (i.e. a CQICH codeword for reporting a GRA error) to allow the UE to report a GRA error to the BS when the GRA error is generated. When receiving the CQICH codeword from the specific UE, the BS may determine that a GRA error has generated to the UE, which will be described with reference to FIG. 6.

Figure 6:
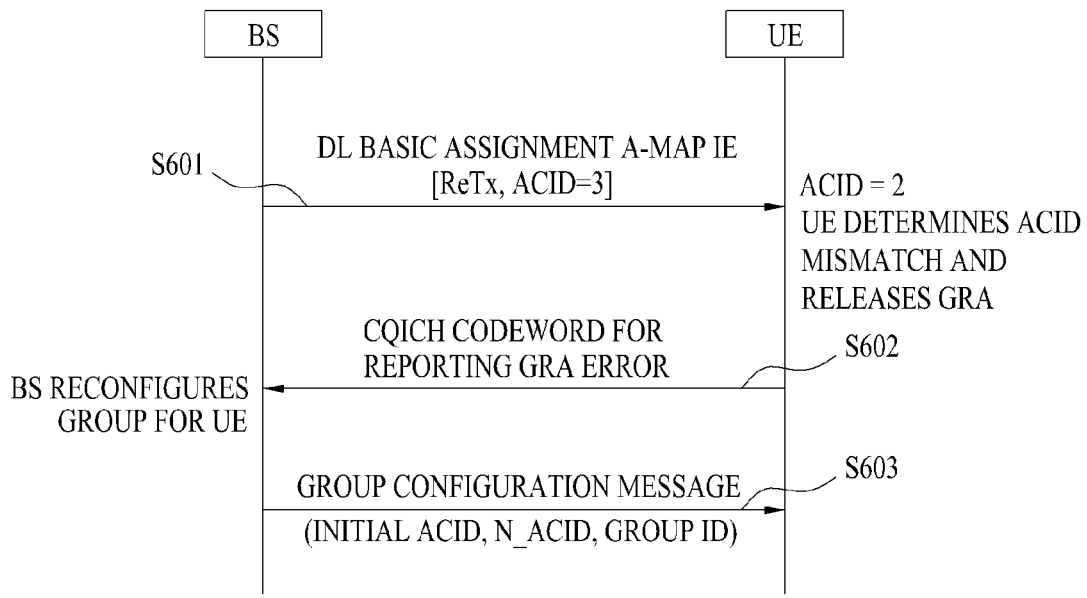
FIG. 6 illustrates an exemplary method for notifying the BS of a GRA error using a specific Channel Quality Indicator Channel (CQICH) codeword according to an embodiment of the present invention.

FIG. 6 illustrates an exemplary method for notifying a BS of a GRA error using a specific CQICH codeword according to an embodiment of the present invention.

The same assumption as for FIG. 3 is applied to FIG. 6 and it is assumed that step S601 takes place after step S308 of FIG. 3.

Referring to FIG. 6, upon generation of an error in an HARQ data burst transmitted according to the last GRA A-MAP IE (i.e. a case where the BS determines the ACID to be 3 but the UE determines the ACID to be 2), the UE transmits a NACK for the HARQ data burst to the BS. Thus, the BS may transmit an A-MAP for retransmitting the packet (i.e. a DL basic assignment A-MAP IE with ACID=3) to the UE (S601).

Because the retransmission A-MAP (i.e. the DL basic assignment A-MAP IE) indicates ACID 3 despite ACID 2 preserved in the UE, the UE may determine an ACID information mismatch in step S509.

Accordingly, the UE deallocates GRA information configured for the UE, determining that GRA for the UE has an error. That is, the UE deallocates a resource allocation related to GRA including data allocation, a feedback channel (an ACK or NACK channel), etc. and discontinues a related operation.

To notify the BS of the GRA error, the UE transmits a pre-allocated CQICH codeword to the BS (S602).

Upon receipt of the specific CQICH codeword from the UE, the BS may delete information about the UE from a corresponding group, determining that a GRA error has generated to the UE. Subsequently, the BS transmits to the UE a group configuration message or a group configuration A-MAP IE for reconfiguring a group for GRA (S603).

An initial ACID, the number of ACIDs, and a group ID for the reconfigured group may be contained in the group configuration message.

Upon receipt of the group configuration message, the UE may perform a GRA operation using the information included in the group configuration message.

When GRA configuration information for a UE is to be deleted due to a GRA error (e.g. a GRA A-MAP IE decoding error) other than an ACID information mismatch as well as when the UE determines that ACID information is different, the UE may use the proposed GEEH EH and a CQICH codeword designated for reporting a GRA error according to the embodiment of the present invention.

According to a further aspect of the embodiment of the present invention, when an ACID mismatch occurs between a BS and a UE in a GRA procedure, the UE may autonomously synchronize its ACID.

For example, when the UE receives a GRA A-MAP IE for which the UE determines the ACID to be 2 but the BS determines the ACID to be 3 and detects a decoding error in a packet received in resources indicated by the GRA A-MAP IE, the UE may transmit a NACK for the packet to the BS. Subsequently, upon receipt of a retransmission MAP with ACID=3 from the BS, the UE may be aware of an ACID mismatch in GRA and may automatically adjust its ACID with respect to the ACID of the BS. That is, the UE changes the ACID value from 2 to 3, determining that the HARQ data burst (i.e. HARQ packet) received based on the GRA A-MAP IE corresponding to ACID 2 is for ACID 3. The UE may apply an ACID to a subsequently received GRA A-MAP IE based on the reset ACID value.

The UE may combine two HARQ data bursts (an initial transmission HARQ data burst and a retransmission HARQ data burst).

If the UE can combine HARQ bursts received on different HARQ channels, the UE combines the HARQ bursts and transmits the reception result (an ACK or NACK) to the BS on an HARQ ACK/NACK channel.

On the contrary, if determining that it cannot combine HARQ bursts received on different HARQ channels, the UE discards the corresponding packet and transmits an ACK instead of a NACK to the BS on an HARQ ACK/NACK channel. The reason for transmitting an ACK is that to receive any more retransmission HARQ data burst is meaningless in a situation where it is impossible to combine an initial transmission HARQ data burst with a retransmission HARQ data burst. Accordingly, the UE preferably receives the next packet by transmitting the ACK.

Meanwhile, the UE may synchronize an ACID to its determined value (herein 2), instead of the value indicated by the BS. In this case, the UE may use an extended header having the configuration illustrated in FIG. 7 to transmit the ACID information to the BS.

Figure 7:
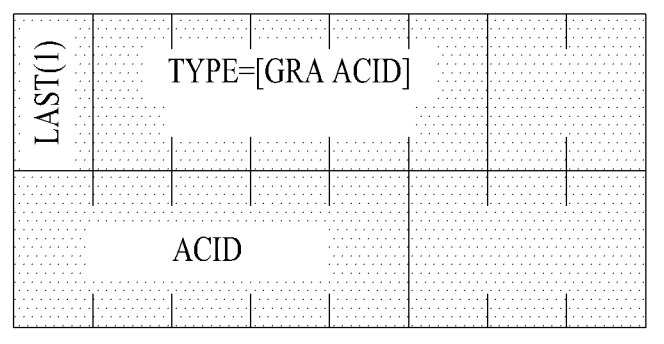

FIG. 7 illustrates an exemplary extended header that a UE can transmit to report its ACID to a BS in the GRA procedure according to the embodiment of the present invention.

Referring to FIG. 7, an ACID field substitutes for the Group ID field of the extended header illustrated in FIG. 5. Thus, upon receipt of this extended header from the UE, the BS may change an ACID for the UE to a value set in the extended header during GRA. This extended header may be referred to as a GRA ACID information extended header.

Before describing how the above extended header is used with reference to FIG. 9, a method for updating an ACID of the UE to an ACID determined by the BS in an ACID mismatch situation will first be described with reference to FIG. 8.

Figure 8:
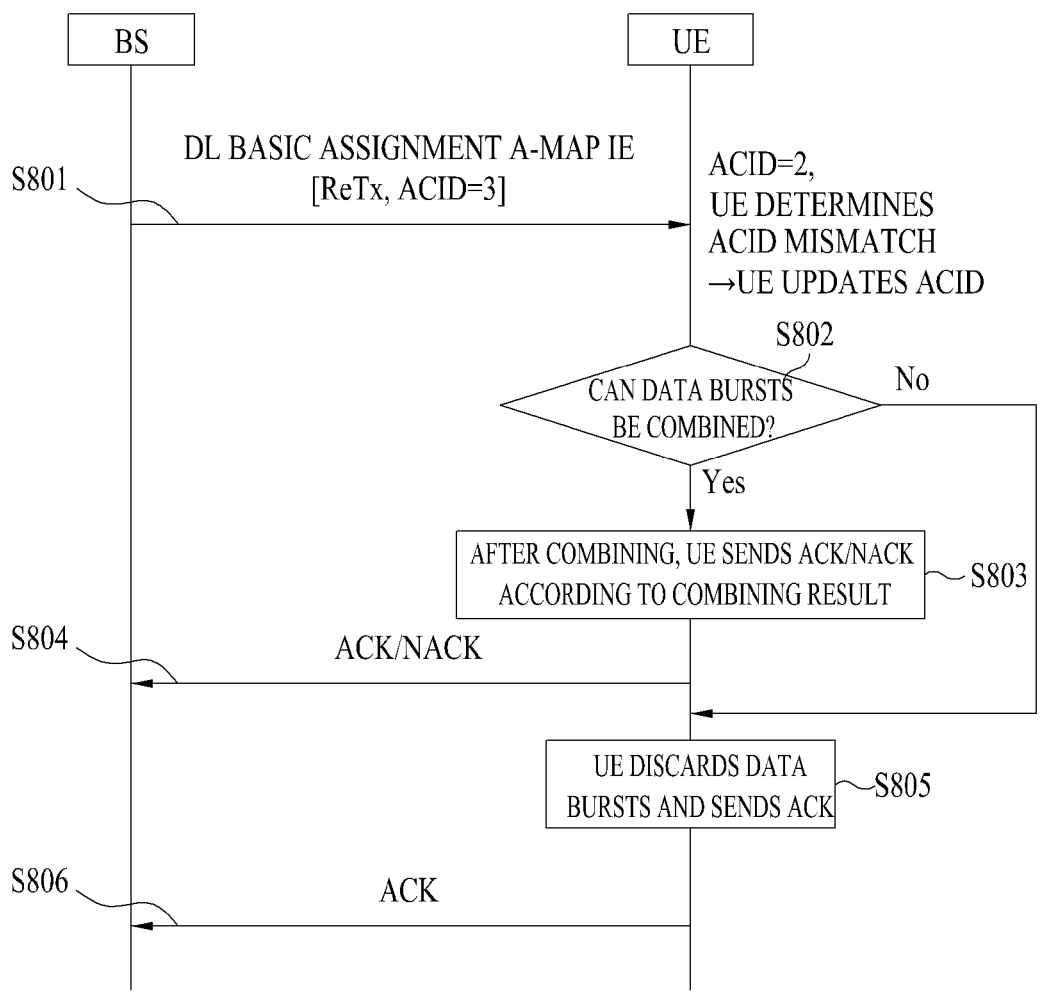
FIG. 8 illustrates an exemplary procedure for updating an ACID of the UE to an ACID of the BS, when an error is generated during the GRA procedure according to the embodiment of the present invention.

FIG. 8 illustrates an exemplary procedure for updating an ACID of a UE to a value transmitted by a BS, when an error is generated in the GRA procedure according to the embodiment of the present invention.

The procedure of FIG. 8 is based on the same assumption as applied to the procedure of FIG. 3 and it is assumed that step S801 takes place after step S308 of FIG. 3.

Referring to FIG. 8, upon generation of an error in an HARQ data burst transmitted according to the last GRA A-MAP IE (i.e. a case where the BS determines the ACID to be 3 but the UE determines the ACID to be 2), the UE transmits a NACK for the HARQ data burst to the BS. Thus, the BS may transmit an A-MAP for retransmitting the packet (i.e. a DL basic assignment A-MAP IE with ACID=3) to the UE (S801).

Because the retransmission A-MAP (i.e. the DL basic assignment A-MAP IE) indicates ACID 3 despite ACID 2 preserved in the UE, the UE may determine an ACID information mismatch.

Accordingly, the UE may update its ACID to the ACID value set in the retransmission A-MAP and then may attempt to combine an initial transmission HARQ burst with a retransmission HARQ burst received in resources indicated by the retransmission MAP (S802).

If the HARQ data bursts can be combined, the UE may determine the combining result (S803) and transmit feedback information (i.e. an ACK/NACK) for the combining result to the BS (S804).

On the contrary, if it is impossible to combine the HARQ data bursts, the UE may discard the corresponding HARQ data burst (S805) and transmit an ACK to the BS (S806). The reason for transmitting an ACK is that to receive any more retransmission HARQ data burst is meaningless in a situation where it is impossible to combine an initial transmission HARQ data burst with a retransmission HARQ data burst.

Now, a description will be given of a method for indicating an ACID of a UE to a BS by an extended header with reference to FIG. 9.

Figure 9:
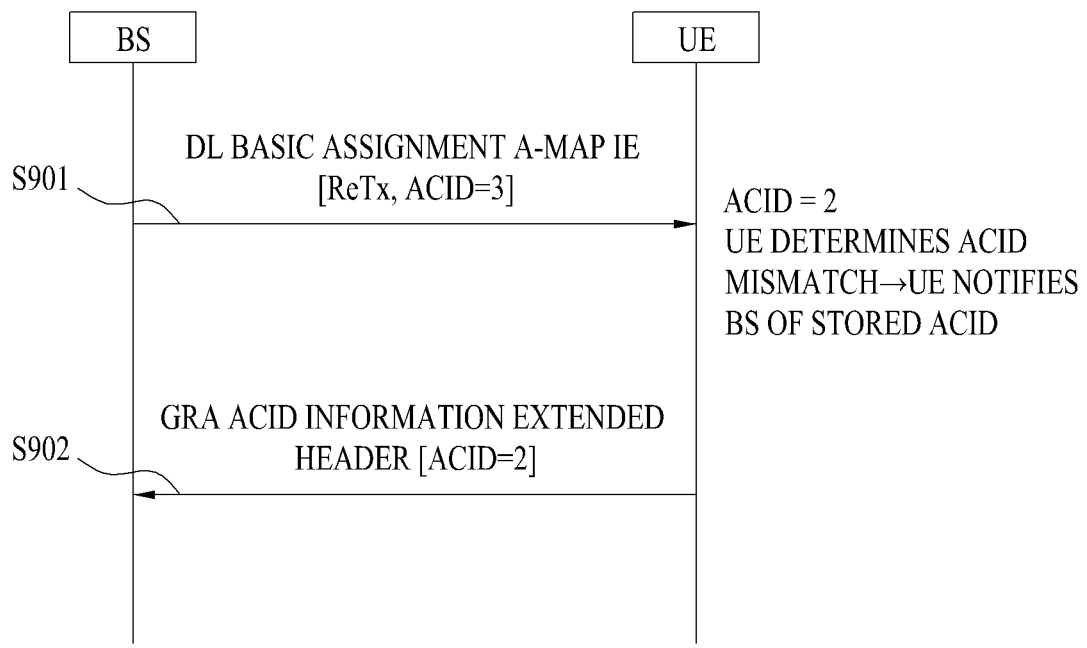
FIG. 9 illustrates an exemplary method for notifying the BS of an ACID determined by the UE, when an error is generated during the GRA procedure according to the embodiment of the present invention.

FIG. 9 illustrates an exemplary procedure for notifying a BS of a UE-determined ACID, when an error is generated in the GRA procedure according to the embodiment of the present invention.

The procedure of FIG. 9 is based on the same assumption as applied to the procedure of FIG. 3 and it is assumed that step S901 takes place after step S308 of FIG. 3.

Referring to FIG. 9, upon generation of an error in an HARQ data burst transmitted according to the last GRA A-MAP IE (i.e. a case where the BS determines the ACID to be 3 but the UE determines the ACID to be 2), the UE transmits a NACK for the HARQ data burst to the BS. Thus, the BS may transmit an A-MAP for retransmitting the packet (i.e. a DL basic assignment A-MAP IE with ACID=3) to the UE (S901).

Because the retransmission A-MAP (i.e. the DL basic assignment A-MAP IE) indicates ACID 3 despite ACID 2 preserved in the UE, the UE may determine an ACID information mismatch.

Accordingly, the UE may transmit to the BS an extended header with its determined ACID value set in an ACID field, having the configuration illustrated in FIG. 7 (S902).

Then the BS may apply the ACID indicated by the header received from the UE to the UE during GRA.

It is clearly understood to those skilled in the art that information included in all extended headers (i.e. a GEER EH or a GRA ACID information extended header) proposed to report a GRA error according to the present invention can be transmitted to a BS by a MAC control management message or a signaling header, apart from the extended headers.

Second Embodiment

As described above, a BS may transmit a group configuration message (or a group configuration A-MAP IE) to a UE in order to add the UE to a group for which GRA is performed.

However, if the UE fails to receive the group configuration message, the BS is not aware of the reception failure and thus continues to allocate resources to the UE in a GRA procedure. Consequently, resources may be unnecessarily wasted.

After the UE belongs to the group through the group configuration message, if the UE is to be excluded from the group or to be switched to another group, the BS may transmit a message or GRA A-MAP IE including group deallocation information to the UE. The BS also needs to know whether the UE has received the GRA A-MAP IE successfully. In case the UE fails to receive the group deallocation information, an error may be generated due to a change in an ACID and/or an HARQ ACK channel.

Accordingly, information about a feedback channel is included in a message or A-MAP IE including group configuration information or group deallocation information so that a UE may notify a BS of successful or failed reception of the message or A-MAP IE through the feedback channel according to another embodiment of the present invention.

1) A method for including feedback channel information in a group configuration message will first be described.

Information about an ACK channel on which the UE will report whether the UE has successfully received a group configuration message (or a group configuration A-MAP IE) for adding the UE to a resource allocation group may be included in the group configuration message (or the group configuration A-MAP IE) in the form of an index (i.e. a MAP ACK channel index).

According to this method, if the UE has successfully received the group configuration message (or the group configuration A-MAP IE), the UE may transmit an ACK signal to the BS on the ACK channel indicated by the MAP ACK channel information included in the group configuration message (or the group configuration A-MAP IE). Upon receipt of the ACK signal on the ACK channel, the BS may determine successful reception of the group configuration message (or the group configuration A-MAP IE) at the UE. If the BS has not received the ACK signal, the BS may determine reception failure of the group configuration message (or the group configuration A-MAP IE) at the UE.

Table 1 below illustrates an example of a group configuration A-MAP IE including information indicating a feedback channel according to another embodiment of the present invention.

TABLE 1

| Syntax | Size | Description/Notes |
| --- | --- | --- |
| A-MAP IE Type | 4 | DL Group Configuration A-MAP IE |
| Group ID | 5 | Indicates group index. |
| MCS Set ID | [3] | Indicates MCS set supported in the group that is selected from [the predefined MCS set candidates] [the configured MCS set candidates in additional broadcast message]. |
| HARQ Burst Size Set ID | [2] | Indicates HARQ data burst size set supported in the group that is selected from the configured HARQ data burst size set candidates in additional broadcast message. |
| GRA Period | [2] | indicate the period of transmitting GRA A-MAP IE<br>0b00: 5 msec<br>0b01: 10 msec |

TABLE 1-continued

| Syntax | Size | Description/Notes |
|---|---|---|
| | | 0b10: 20 msec |
| | | 0b11: 30 msec |
| Long TTI Indicator | 1 | Defines number of subframe spanned by the allocated resource. |
| | | 0b0: 1 subframe (default) |
| | | 0b1: 4 DL subframe for FDD or all DL frame subframe for TDD |
| MAP ACK Channel Index | TBD | Depending on MAP ACK channel definition in UL control. |
| | | It indicates the MAP ACK channel for the specified AMS. |
| If (Nsubframe, A-MAP ==2){ | | |
|     Allocation Relevance | 1 | Subframe index when an A-MAP region occurs every 2 subframes (Nsubframe, A-MAP = 2) |
| | | 0b0: Allocation in the first DL subframe relevant to an A-MAP region |
| | | 0b1: Allocation in the second DL subframe relevant to an A-MAP region |
| } | | |
| User Bitmap Index | [5] | Indicates User Bitmap index to the AMS. An AMS may have multiple |
| | | User Bitmap Indexes in a group. |
| Padding | Variable | Padding to reach byte boundary. |
| MCRC | [16] | 16 bit masked CRC |

Referring to Table 1, the group configuration A-MAP IE includes MAC ACK Channel Index to thereby indicate an ACK channel that will carry a feedback indicating successful or failed reception of the MAP at the UE.

Table 2 below illustrates an example of a GRA A-MAP IE including group deallocation information and information indicating a feedback channel according to another embodiment of the present invention.

TABLE 2

| Syntax | Size | Description/Notes |
|---|---|---|
| A-MAP IE Type | [4] | TBD A-MAP IE types distinguish between UL/DL, SU/MU, OL/CL MIMO operation, persistent/non-persistent allocation, basic/extended IEs including GRA |
| | | DL Group Resource Allocation A-MAP IE |
| Resource Offset | [6] [8] | Indicates starting LRU for resource assignment to this group |
| ACK Channel Offset | TBD | Indicates the start of ACK index used for scheduled allocations at this subframe in the group. |
| NDA | [2] [3] | Indicates the number of deleted AMSs in the group. |
| For(i=0,i++,I<NDA){ | | |
|     User Bitmap Index | [5] | Indicates the User Bitmap Index of deleted AMSs. |
| MAP ACK Channel Index | TBD | Depending on MAP ACK channel definition in UL control. |
| | | It indicates the MAP ACK channel for the specified AMS. |
| } | | |
| User Bitmap Size | [2] [5] | TBD |
| | | Size of the user bitmap; may not be needed if user bitmap size is included in configuration message/A-MAP IE |
| | | Indicates the length of User Bitmap |
| User Bitmap | Variable | Bitmap to indicate scheduled users AMSs in a group. The size of the bitmap is equal to the User Bitmap Size |
| Resource Assignment Bitmap | Variable | Bitmap to indicate MCS/resource size for each scheduled user AMS |
| Padding | Variable | Padding to reach byte boundary |
| MCRC | [16] | 16 bit masked CRC |

2) A description will now be given of a method for including a message or GRA A-MAP IE including information needed to exclude a UE from a group.

Information about an ACK channel on which the UE will report whether the UE has successfully received a GRA A-MAP IE (or a message having information to the effect) with group deallocation information (e.g. a deleted user bitmap index) for excluding the UE from a group may be included in the GRA A-MAP IE.

If the UE has successfully received the GRA A-MAP IE including the group deallocation information for the UE, the UE may transmit an ACK signal to the BS on the ACK channel indicated by the MAP ACK channel information included in the GRA A-MAP IE. Upon receipt of the ACK signal on the ACK channel, the BS may determine successful reception of the A-MAP IE at the UE. If the BS has not received the ACK signal, the BS may retransmit the A-MAP IE with the group deallocation information to the UE.

Referring to Table 2, the group configuration A-MAP IE includes MAC ACK Channel Index to thereby indicate an ACK channel that will carry a feedback indicating successful or failed reception of the MAP at the UE.

Third Embodiment

When a BS adds a UE to a group by a group configuration message, an ACID to be used for transmission and reception of a GRA A-MAP may be implicitly determined based on information about an initial ACID and the number of ACIDs included in the group configuration message. In this case, the initial ACID value is applied when the UE receives a $1^{st}$ GRA A-MAP IE and then the ACID is increased sequentially.

If the UE fails to receive the $1^{st}$ GRA A-MAP IE, upon receipt of a $2^{nd}$ GRA A-MAP IE, the UE will apply the initial ACID to the $2^{nd}$ GRA A-MAP IE. As a result, ACIDs will be different between the UE and the BS.

To avert this problem, the BS may transmit a group configuration message including information about a time point when the initial ACID is applied. Thus, the UE may be aware of the time to use the initial ACID after receiving the group configuration message. Even though the UE fails to receive a GRA A-MAP IE corresponding to the initial ACID, the UE may calculate an ACID implicitly.

For instance, if the initial ACID is 1, the number of ACIDs is 3, and the UE fails to receive a GRA A-MAP IE at a time for applying the initial ACID and successfully receives a GRA A-MAP IE in the next resource allocation period, the UE may determine its ACID to be 2 at the time of receiving the GRA A-MAP IE and acquire ACID synchronization with the BS. The time point may be a frame-based (a frame to which the ACID is to be applied), superframe-based (a superframe to which the ACID is to be applied), or subframe-based (a subframe to which the ACID is to be applied).

Structures of UE and BS

A UE and a BS (FBS or MBS) that can implement the above-described embodiments of the present invention, according to another embodiment of the present invention will be described.

The UE may act as a transmitter on an uplink and as a receiver on a downlink, while the BS may act as a receiver on the uplink and as a transmitter on the downlink.

The transmitter and the receiver may include a processor, a module, a part and/or means for implementing the embodiments of the present invention. Especially they may include a module (means) for encrypting a message, a module for decrypting an encrypted message, an antenna for transmitting and receiving messages, etc. An example of the transmitter and receiver will be described with reference to FIG. 10.

FIG. 19 is a block diagram of a transmitter and a receiver according to another embodiment of the present invention.

Referring to FIG. 10, the left block diagram illustrates the structure of the transmitter, and the right block diagram illustrated the structure of the receiver. Each of the transmitter and the receiver may include an antenna 5 or 10, a processor 20 or 30, a Transmission (Tx) module 40 or 50, a Reception (Rx) module 60 or 70, and a memory 80 or 90. The components will be described in greater detail.

The antennas 5 and 10 externally transmit signals generated from the Tx modules 40 and 50 or output received external radio signals to the Rx modules 60 and 70. When Multiple Input Multiple Output (MIMO) is supported, two or more antennas may be used.

An antenna, a Tx module, and an Rx module may collectively form a Radio Frequency (RF) module.

The processors 20 and 30 provide overall control to the UE. For example, the processors 20 and 30 may perform a control function for implementing the embodiments of the present invention, a variable Medium Access Control (MAC) frame conversion control function based on service characteristics and a propagation environment, a handover function, and an authentication and encryption function. More specifically, the processors 20 and 30 may provide overall control to perform the above-described a random access procedure.

Especially, the processor of the UE may receive a group configuration message from the BS and acquire information about its group and information about an initial ACID and the number of ACIDs for use in GRA which will be performed by a GRA A-MAP IE. In addition, each time a GRA A-MAP IE is received, the processor determines an ACID corresponding to the GRA A-MAP IE based on the information about the initial ACID and the number of ACIDs. If failing to receive initial data transmitted based on the GRA A-MAP IE, the processor may transmit a NACK to the BS. Upon receipt of a retransmission MAP in response to the NACK, the processor of the UE compares its determined ACID with an ACID contained in the retransmission MAP. If the ACIDs are different, the processor may report the error to the BS or transmit its ACID to the BS.

Besides, the processor of the UE may provide overall control to the operations described according to the foregoing embodiments of the present invention.

The Tx modules 40 and 50 may encode and modulate transmission data scheduled by the processors 20 and 30 in a predetermined coding and modulation scheme and output the modulated data to the antenna 10.

The Rx modules 60 and 70 may recover the original data by decoding and modulating radio signals received through the antennas 5 and 10 and thus may provide the original data to the processors 20 and 30.

The memories 80 and 90 may store programs for processing and control operations of the processors 20 and 30 and may temporarily store input/output data. Also, each of the memories 80 and 90 may include at least one of a flash memory-type storage medium, a hard disc-type storage medium, a multimedia card micro-type storage medium, a card-type memory (e.g. an Secure Digital (SD) or extreme Digital (XS) memory), a Random Access Memory (RAM), a Static Random Access Memory (SRAM), a Read Only Memory (ROM), an Electrically Erasable Programmable Read-Only Memory (EEPROM), a Programmable Read-Only Memory (PROM), a magnetic memory, a magnetic disc, and optical disk.

Meanwhile, the BS may perform a control function for implementing the forging embodiments of the present invention, an Orthogonal Frequency Division Multiple Access (OFDMA) packet scheduling function, a Time Division Duplex (TDD) packet scheduling and channel multiplexing function, a MAC frame conversion control function based on a service characteristic and a propagation environment, a high-speed traffic real-time control function, a handover function, an authentication and encryption function, a packet modulation and demodulation function for data transmission, a high-speed packet channel coding function, and a real-time modem control function, through at least one of the above-described modules, or the BS may further include a separate means, module, or part for performing thee function.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein. It is obvious to those skilled in the art that claims that are not explicitly cited in each other in the appended claims may be presented in combination as an embodiment of the present invention or included as a new claim by a subsequent amendment after the application is filed.

INDUSTRIAL APPLICABILITY

While a procedure for more reliably allocating group resources and a UE configuration for performing the procedure in a broadband wireless access system has been described above in the context of an IEEE 802.16m system, the present invention is also applicable to many mobile communication systems other than IEEE 802.xx systems

The invention claimed is:

1. A method for performing a group resource allocation operation at a user equipment in a broadband wireless access system, the method comprising:
receiving a message including group configuration information from a base station;
determining a channel Identifier (ID) of a first MAP for group resource allocation, received from the base station, using the group configuration information;
receiving a second MAP including a base station-determined channel ID from the base station;
comparing a user equipment-determined channel ID with the channel ID included in the second MAP; and
transmitting an extended header including mismatch information to the base station, if the channel ID of the first MAP determined by the user equipment is different from the channel ID included in the second MAP as a result of the comparison.

2. The method according to claim 1, further comprising:
decoding a data burst received in a resource area indicated by the first MAP; and
transmitting feedback information indicating a result of the decoding to the base station,
wherein the second MAP reception is performed when the decoding is failed and the feedback information is a NACK.

3. The method according to claim 2, wherein the message is a group configuration message and the group configuration information includes information about an ID of a group to which the user equipment belongs, an initial channel ID, and the number of channel IDs.

4. The method according to claim 3, wherein the first MAP is a Group Resource Allocation Advanced-MAP Information Element (GRA A-MAP IE), the second MAP is a basic assignment A-MAP IE, and the channel ID is a hybrid Automatic repeat request Channel ID (ACID).

5. The method according to claim 2, wherein the mismatch information includes a type field set to a value indicating a mismatch error and an ID of a group to which the user equipment belongs, or a type field set to a value indicating inclusion of a channel ID determined by the user equipment and the channel ID determined by the user equipment.

6. A method for performing a group resource allocation operation at a base station in a broadband wireless access system, the method comprising:
transmitting a message including group configuration information to a user equipment;
transmitting to the user equipment a first MAP for group resource allocation corresponding to a channel Identifier (ID) determined according to the group configuration information;
transmitting to the user equipment a data burst in a resource area indicated by the first MAP;
transmitting to the user equipment a second MAP indicating an area in which the data burst is to be retransmitted and including the channel ID, upon receipt of a NACK for the data burst from the user equipment; and
receiving an extended header from the user equipment according to whether a user equipment-determined channel ID is identical to the channel ID included in the second MAP.

7. The method according to claim 6, wherein the message is a group configuration message and the group configuration information includes information about an ID of a group to which the user equipment belongs, an initial channel ID, and the number of channel IDs.

8. The method according to claim 7, wherein the first MAP is a Group Resource Allocation Advanced-MAP Information Element (GRA A-MAP IE), the second MAP is a basic assignment A-MAP IE, and the channel ID is a hybrid Automatic repeat request Channel ID (ACID).

9. The method according to claim 8, wherein if the user equipment-determined channel ID is different from the channel ID included in the second MAP, the extended header includes a type field set to a value indicating a mismatch error and an ID of a group to which the user equipment belongs.

10. The method according to claim 9, further comprising transmitting to the user equipment a third MAP including group deallocation information to delete the user equipment from the group.

11. The method according to claim 8, wherein if the user equipment-determined channel ID is different from the channel ID included in the second MAP, the extended header includes a type field set to a value indicating inclusion of a channel ID determined by the user equipment and the channel ID determined by the user equipment.

12. The method according to claim 11, further comprising updating the channel ID determined by the base station to the channel ID determined by the user equipment.

13. A user equipment comprising:
a processor; and
a Radio Frequency (RF) module for externally transmitting and receiving radio signals,
wherein the processor acquires group configuration information from a message for group configuration received from a base station, determining a channel Identifier (ID) of a first MAP for group resource allocation, received from the base station, using the group configuration information, and controls transmission of an extended header including mismatch information to the base station, if the channel ID of the first MAP determined by the user equipment is different from a channel ID included in a second MAP received from the base station.

14. The user equipment according to claim 13, wherein the processor controls decoding of a data burst received in a resource area indicated by the first MAP and controls transmission of feedback information indicating a result of the decoding to the base station, and wherein the second MAP is received when the decoding is failed and the feedback information is a NACK.

15. The user equipment according to claim 14, wherein the message is a group configuration message and the group configuration information includes information about an ID of a group to which the user equipment belongs, an initial channel ID, and the number of channel IDs.

16. The user equipment according to claim 14, wherein the first MAP is a Group Resource Allocation Advanced-MAP Information Element (GRA A-MAP IE), the second MAP is a basic assignment A-MAP IE, and the channel ID is a hybrid Automatic repeat request Channel ID (ACID).

17. The user equipment according to claim 15, wherein the mismatch information includes a type field set to a value indicating a mismatch error and an ID of a group to which the user equipment belongs, or a type field set to a value indicating inclusion of a channel ID determined by the processor and the channel ID determined by the processor.

* * * * *